Figure 1:
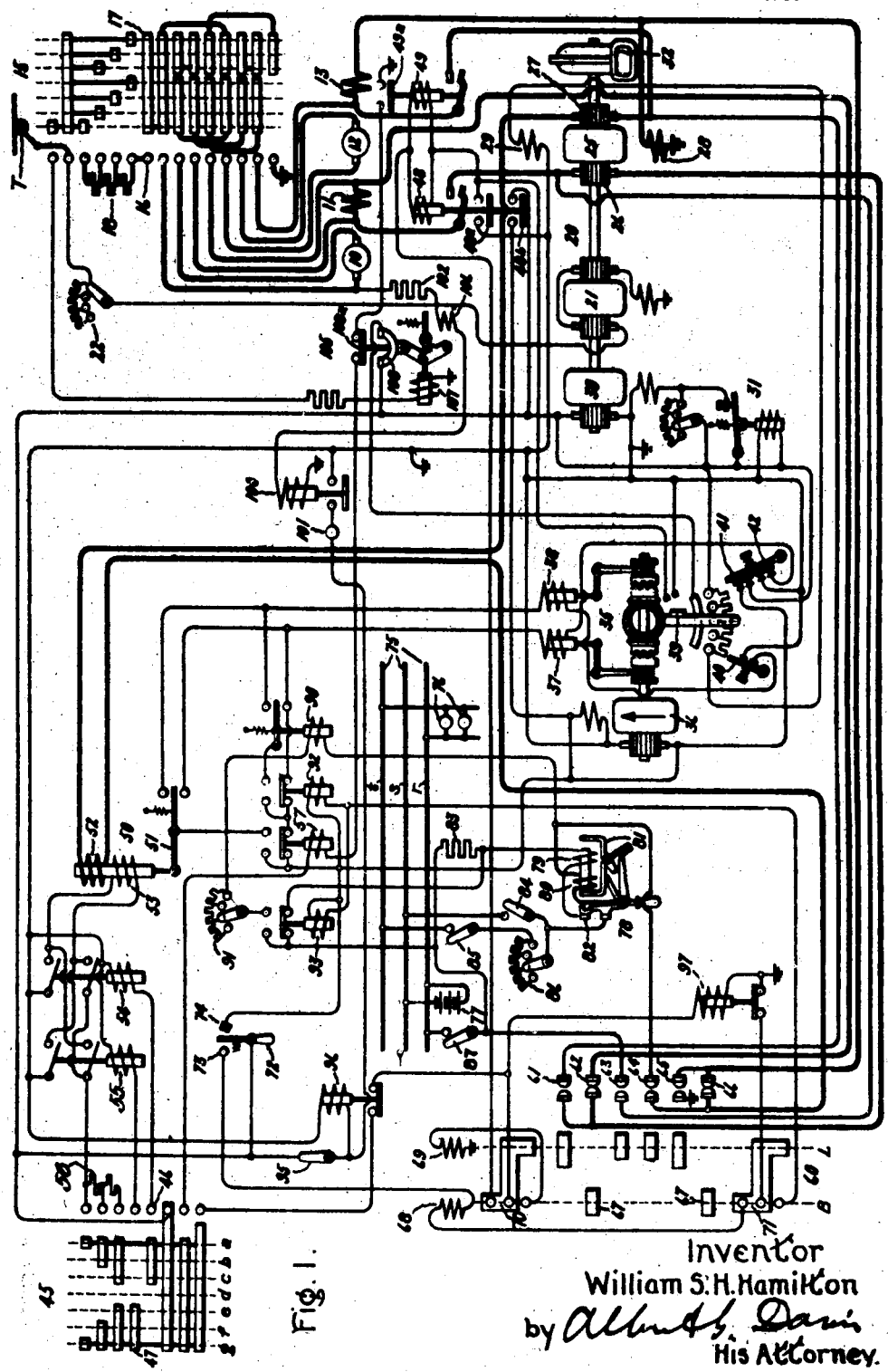

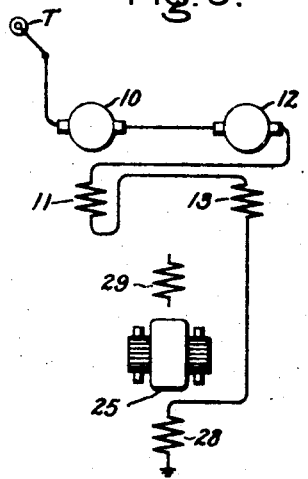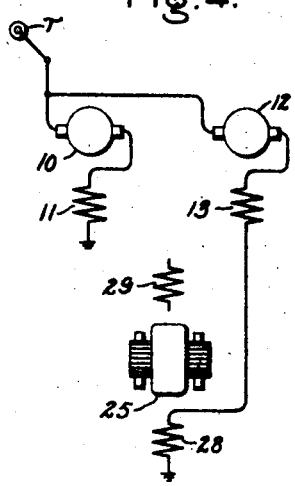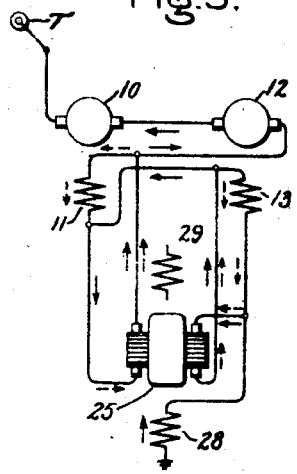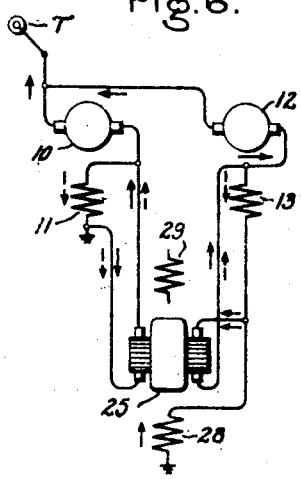

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION.

1,304,178.      Specification of Letters Patent.      Patented May 20, 1919.

Application filed March 24, 1916. Serial No. 86,356.

*To all whom it may concern:*

Be it known that I, WILLIAM S. H. HAMILTON, a citizen of the United States, residing in Schenectady, county of Schenectady, State of New York, have invented certain new and useful Improvements in Electrical Systems of Power Transmission, of which the following is a specification.

My invention relates to electrical systems of power transmission and particularly to systems of regenerative control comprising a dynamo-electric machine and a source of current adapted to be connected to a field winding thereof.

It is well understood that, although series dynamo-electric machines are especially suited for motor service, where the voltage of the supply circuit and the load are variable, their use, in systems where it is desired not only that they operate as motors to drive a load but as generators to brake a load, requires that some means be provided to separately excite the series field windings during the generator operation thereof due to the unstable characteristic of a series generator. It is not alone sufficient for the satisfactory generator operation of a series dynamo-electric machine that its series field winding be separately excited but, in order to secure the generator characteristics best suited to certain service conditions and particularly to service conditions met with in operating a series dynamo-electric machine as a generator to produce regenerative braking, it is necessary that the excitation of the series field winding be controlled in a certain manner. There still remain, however, practical difficulties in various features, such as in protecting the motors from the effects of over-voltage and of trolley voltage variation, in adapting the control to multiple unit operation, in providing for stability of braking torque with change of speed, and in providing an economical arrangement for train lighting.

One object of my invention is, then, to overcome the difficulties referred to and to provide a simple, safe and economical control for dynamo-electric machines and, particularly, for series dynamo-electric machines adapted to operate, in systems of regenerative control, either as motors to propel a load or as generators to produce regenerative braking. Although my invention is particularly suited to traction systems certain features thereof are generally applicable to motor or generator control systems.

Another object of my invention is to provide improved means for controlling the generator operation of a series dynamo-electric machine.

Another object of my invention is to provide such an arrangement of the apparatus used for braking operations that it can be employed to furnish current for lighting when it is not desired to brake the vehicle.

Other objects of my invention will appear as the specification proceeds.

Figure 2:
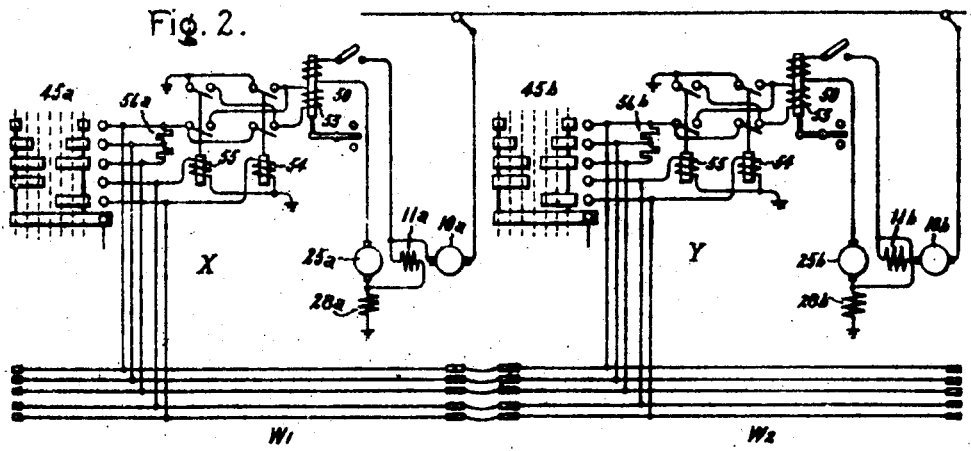
Figure 7:
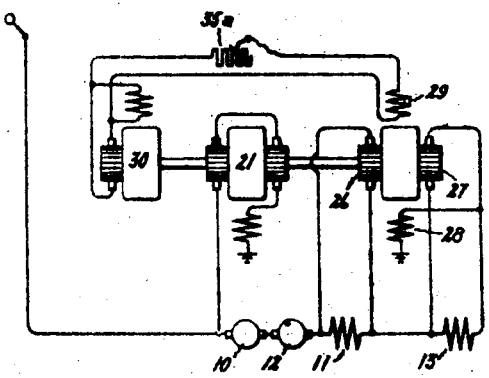
Figure 8:
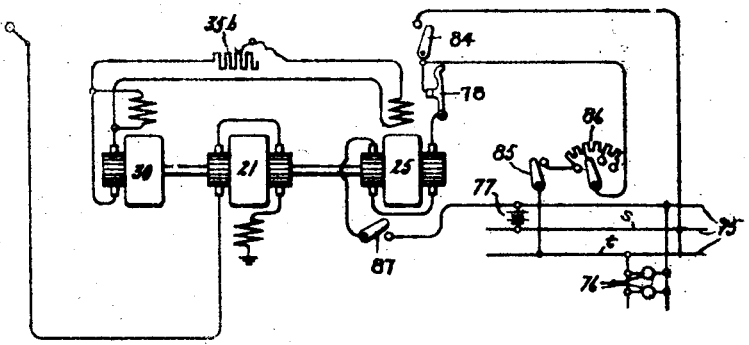

My invention will best be understood by reference to the accompanying drawings in which my invention is illustrated as applied to a system of regenerative control and in which Figure 1 is a diagram showing the apparatus employed and the circuits connecting the same; Fig. 2 is a diagram showing the utility of my arrangement for multiple unit operation; Fig. 3 is a diagram showing the dynamo-electric machines connected for series motoring operation; Fig. 4 is a diagram showing the dynamo-electric machines connected for parallel motoring operation; Fig. 5 is a diagram showing the dynamo-electric machines and the exciter connected for braking operation with the dynamo-electric machines connected in series; Fig. 6 is a diagram showing the dynamo-electric machines and the exciter connected for braking operation with the dynamo-electric machines connected in parallel; Fig. 7 is a diagram showing the principal circuits during braking operation; Fig. 8 is a similar diagram showing the circuits when the apparatus is employed for train lighting.

Although my invention is applicable to various types of traction units, one principal field of application is to an electric locomotive, and for ease of description I shall hereafter consider that it has been so applied. Further, it is applicable for use with any number of dynamo-electric machines which, in view of their normal function, will hereinafter be generally referred to as traction motors or simply as motors, but for the sake of simplicity I have shown only two such motors, having armatures 10 and 12 and field windings 11 and 13. When used for motoring operations, the power will be supplied to these motors from any convenient source, such, for example, as the trolley T, and during regeneration power will be returned to line through the trolley. Any convenient means may be employed for controlling the voltage applied to the motors and for connecting the same in series or in parallel. This arrangement forms no part of my invention. For the sake of completeness, however, I have illustrated diagrammatically in Fig. 1, one possible form of a main controller 15, which is shown as provided with fixed contacts 16 coöperating with moving contacts 17 which may be conveniently arranged upon a rotating drum. Movement of this drum will first connect the motors in series between the trolley and ground through all of the starting resistance 18. Further movement of the controller will result in cutting out this resistance, and later will connect the motors in parallel. When used upon a system upon which the distribution voltage is considerable, it will be found preferable to so arrange the main controller that the field windings of the traction motors are kept upon the ground side of the armatures, in order to relieve the insulation strain upon the same, and although I have illustrated such an arrangement, it will be obvious that my invention is in no wise so limited in its application. The series arrangement of the motors with all the resistance 18 removed from circuit is illustrated in Fig. 3 and the parallel arrangement of the motors with all the resistance 18 removed from circuit is illustrated in Fig. 4.

As above mentioned, one well known arrangement for controlling series motors in order to secure regenerative braking involves the use of an independent source of voltage which may be connected in a local circuit with the field winding of the traction motor. For the purpose of furnishing such a source of voltage, I have provided a motor generator set 20, driven by means of a suitable motor 21, shown as a double commutator series motor having its commutators connected in series with one another, and supplied with power from the trolley T through a starting resistance 22. Driven by this motor 21, and preferably forming a part of the same motor generator set, is an exciter 25 provided with independent armature windings connected to commutators 26 and 27, which constitute the independent sources of voltage to be connected to the field windings of the traction motors. The use of a double commutator machine for this exciter is preferable merely because of the resulting economy, and it is evident that two separate machines would serve as well. The excitation of the exciter 25 is provided by means of a main field winding 29 which will preferably be excited from a control generator 30 which may conveniently form part of the same motor generator set. In addition, a series field winding 28 of a few turns is preferably provided for a purpose to be later explained, and is connected to carry the total current flowing through the traction motor armatures when the motors are connected in series and the total current flowing through but one of the traction motor armatures when the motors are connected in parallel. This control generator 30 will preferably be a shunt machine, and the voltage which it delivers may be maintained constant in any convenient manner, as by means of the voltage regulator indicated diagrammatically at 31. It will oftentimes be found convenient to mount a centrifugal fan 32 such as is commonly employed for the ventilation of various parts of the machinery, upon this same motor generator set, and because of this arrangement it will be seen that no danger will result from the use of a series driving motor, owing to the fact that the load supplied by this fan increases with the speed of the set. Any tendency of the driving motor to run away will thereby be avoided.

I then provide means for controlling the potential supplied by the exciter 25 and means responsive to the sum of the currents in the armature and field windings of a traction motor for regulating this controlling means so as to hold this sum constant. The means for controlling the potential of the exciter, in the embodiment of my invention which I have illustrated herein, consists of a motor driven rheostat 35 arrange in circuit with the main field winding of the exciter. When the rheostat is being used, the driving motor 36 will run continuously in the direction indicated by the arrow. The shaft driven by this motor is adapted to be connected to the moving arm of the rheostat by means of bevel gears which may be connected to rotate with the shaft by means of the clutches thrown into operation by the clutch coils 37 and 38. An interlock 39 is provided on the moving arm of the rheostat, for a purpose to be later explained, and limit switches 40, 41 and 42 are arranged to be operated when the moving arm is in either of its extreme positions.

When it is desired to commence braking operations upon the locomotive, manipulation of the braking controller 45 will be necessary, whereby the exciter armatures 26 and 27 may be connected in a local circuit with the field windings 11 and 13 and the setting of the automatic apparatus for controlling the excitation of the exciter 25 determined. This braking controller may be constructed in any convenient manner, and will preferably comprise fixed contacts 46 and moving contacts 47. Coöperating with this braking controller 45 is a regulating means responsive to the sum of the currents in the field and armature of a traction motor and, as here illustrated, consists of a contact-making ammeter 50, constructed in the usual manner with the contact arm 51 arranged to make contact with one or the other of two fixed contacts, and controlled in its movements by means of a series coil 52 and a shunt coil 53. The direction of the current through the shunt coil 53 will be determined by the reversing relays 54 and 55, and its magnitude by the resistance 56, both of which are in turn controlled by the braking controller 45 when moved to any one of its positions $a$ to $g$, inclusive. This contact-making ammeter 50 will control the movements of the automatic rheostat 35 in a manner to be later described, and when the braking controller is moved to its off position it will be rendered ineffective by means of the transfer relay 57, which is adapted, in its energized position, to cause the return of the automatic rheostat 35 to its full resistance position.

In certain instances, and especially where my invention is applied to a locomotive used for hauling passenger trains, it will be necessary to supply current for the lighting of the cars of the train and for charging the storage batteries usually supplied with such lighting equipments. I have found that the exciter 25 is well adapted for this purpose when the same is not being utilized to control the traction motors for regenerative braking. In order that it may be so utilized, however, some apparatus must be employed whereby the connections of the same may be radically changed. I have, therefore, illustrated in Fig. 1 what I shall term a "braking-lighting" switch 60. This switch may be constructed in any convenient fashion, but I have herein illustrated the same diagrammatically as comprising pairs of contacts 61 to 66, inclusive, adapted to be brought into engagement with one another by means of cams 67. These cams will preferably be mounted on a rotating shaft, and may be operated by means of a pneumatic engine (not illustrated) whose movements are controlled by means of the coils 68 and 69. Operatively related to the moving parts of this switch 60 are interlocking switches 70 and 71 whose function will be later explained.

The lighting current for the train will be conducted over train lines 75, and the lights 76 and batteries 77 in each car will be connected directly to the train lines. In the locomotive, and controlling the connection of the exciter 25 to the train lines, is a combined circuit breaker and reverse current relay 78, provided with a shunt coil 79, a series coil 80, a trip 81, and an extra contact 82 in the circuit of the shunt coil. A resistance 83 is also provided in the circuit of the shunt coil. Hand-operated switches 84 and 85 and a regulating resistance 86 are used to further control the connection of the exciter to the train line 75 and to control the difference between the voltages delivered to the battery and to the lights. When the exciter 25 is utilized for train lighting, I control the excitation of the main field winding 29 by means of the same automatic rheostat 35, and I control this in turn by means of a contact-making voltmeter 90 responsive to the voltage delivered by the exciter. The regulating resistance 91 is used to determine the setting of the voltmeter 90, and the transfer relay 92 is provided in connection with said voltmeter, whose function is similar to that of the transfer relay 57. In connection with this apparatus, a lighting relay 93 is arranged when energized to put in circuit the voltmeter winding, and when de-energized to short circuit the resistance 83.

When it is desired to commence lighting operations, the coil 68 of the braking lighting switch 60 may be energized through the contact 73 of the double throw switch 72. A suitable spring is provided to prevent retention of the switch 72 in this position; it may, however, be thrown to the contact 74 and held there by friction. With two or more locomotives running in parallel, if it should be desired to brake with certain of these locomotives and to utilize the others for train lighting, this may conveniently be accomplished by means of the braking cut-out switch 95, associated with which is the relay 96. When this relay 96 is energized and the braking controller is in one of its operating positions $a$ to $g$, then the lighting cut-out relay 97 will be energized and will prevent energization of the coil 68 to throw the switch 60 to the lighting position L. If however, switch 95 is opened, then relay 96 will open and prevent the energization of coil 69 to throw the switch 60 to the braking position B. In order to protect the traction motors against abnormal voltage conditions I have provided the relays 100 and 105, whose operating coils are connected in series with one another and with a resistance 102 so that they are responsive to the voltage across the traction motors. The relay 100 will be energized when normal voltage is supplied to the traction motors, and when so energized will light the pilot lamp 101, provided the motor generator set is running, and the lighting of this lamp will serve as an indication that the resistance 102 is in good condition so that the relay 105 will operate properly. The relay 105 is responsive only to an abnormal voltage, and when such a voltage is attained the trip coil 106 will release the relay to open the main contacts 108 and thereby insert all the resistance of the rheostat 35 in circuit with main field winding 29 to thereby reduce the voltage generated by the traction motors. A reset coil 107 is provided, which is arranged to be energized only at the first position of the main controller. An interlocking switch 108ª is also provided upon this relay.

The operation of the locomotive during motoring has already been described, and in order to describe the operation during braking, let us assume the following conditions: the main controller 15 should preferably will be in such a position that the traction motors are connected either in series or in parallel, without the inclusion of any of the starting resistances and the motor generator set 20 should be in operation. Let us assume that the motor-operated rheostat 35 is in the extreme right-hand position, so that all of the resistance thereof is in circuit and the interlock switch 39 is closed. Let us assume, further, that the braking lighting switch 60 is in the position B, so that the interlocks 70 and 71 are in the positions shown and the contacts 62 and 66 are closed. The limit switches 41 and 42 will then be opened and the circuit breaker 78 will be open, but otherwise the hand-operated switches will be in the positions shown. If, then, the braking controller is moved to the first position $a$, the electro-magnetic switches 48 and 49 will be energized through the circuit comprising the upper brush of generator 30, braking controller 45, relay 96, interlock 70 on the braking lighting switch 60, operating windings of electro-magnetic switches 48 and 49 which are in multiple, the interlock 39 on the moving arm of the motor operated rheostat 35, the lower brush and the armature of generator 30. The closure of the switches 48 and 49 effects the connection of the exciter armatures 26 and 27 to the field windings 11 and 13. As soon as the switch 48 is closed, it will thereby close the interlocks 48ª and 48ᵇ. The first of these will complete a holding-in circuit for the windings of the switches 48 and 49 extending from the conductor, leading from the lower terminals of the operating windings of electro-magnetic switches 48 and 49, through the interlock 48ª to the lower brush of the generator 30. As soon as the interlock 49ª is closed, then the transfer relay 57 will be energized through a circuit comprising the upper brush of generator 30, the braking controller 45, the operating winding of the transfer relay 57, the interlock 108ª on the relay 105, the interlock 49ª, ground, and the lower brush and armature of generator 30, and will thereby put the motor-operated rheostat 35 under the control of the contact-making ammeter 50. Current for the operation of the motor 36, and the clutch coil 38 will first be supplied through the interlock 48ᵇ through a common circuit, comprising the upper brush of generator 30, interlock 48ᵇ, branch circuits one of which comprises the motor 36 and the other of which comprises the upper contacts of transfer relay 57, contact arm 51 of contact making ammeter 50, clutch coil 38, limit switch 40 and a common circuit comprising the lower brush and armature of generator 30, and later, after the arm of the motor-operated rheostat 35 has left its original position, current will be supplied to the motor 36 and clutch coil 38 through this interlock and the limit switch 41 in parallel and to the clutch coil 37 through the limit switch 42. At this step $a$, the reversing relay 54 will have been closed, and will thereby energize the coil 53 to a maximum amount in a direction to aid the coil 52. The contact arm 51 will be held in mid-position by a predetermined pull on its core. If, then, the two coils 52 and 53 are aiding, and coil 53 is excited to its maximum amount, only a very small current in coil 52 will be needed in order to secure this pull. The result is, that the current flow in the exciter armature 27 will be maintained constant at some small value, for any increase in current therein will so increase the pull on the ammeter core that the solenoid 37 will be energized and more of the resistance of the rheostat 35 inserted in the circuit of the field winding 29. Similarly, too small a current in the armature 27 will reverse the action and decrease the resistance and increase the field current of the exciter. Further movement of the controller inserts more and more of the resistance 56, until the step $c$ is reached, at which point the whole resistance is included and the current in the winding 53 reduced to its minimum value. A much larger current must now flow in the coil 52, and hence in the armature 27, in order to hold the contact arm in mid-position. At the step $d$ the circuit of this winding is interrupted so that coil 53 has no effect, while at the step $e$ the direction of the current supplied thereto is reversed by the relay 55 and is of a small amount, because the whole of the resistance 56 is now included. As the arrangement of the circuits was such that for the first three steps of the braking controller the winding 53 aided the winding 52, it will now be seen that, owing to the reversal of the current in said winding, it will oppose the winding 52, and that further movement of the controller will increase the current, and consequently, the bucking effect of said winding, until the step $g$ is reached, when the current in the winding 53 will have again attained a maximum value. At these steps $e$ and $g$, the effect will be to still further increase the current flow in the coil 52 necessary to bring the ammeter contact arm to a balanced position, with the result that the exciter armature current will be gradually increased, being held constant at a definite value for any particular setting of the controller.

It should be here noted that the energizing circuit for the switches 48 and 49 passes through the interlock 70 on the braking-lighting switch 60, and that these switches cannot be energized until the said switch 60 has been thrown to its braking position. This, therefore, insures that the exciter armatures shall not be connected to the traction motor field windings until the proper connections have been made by the switch 60. Furthermore, it will be noted that the transfer relay 57 is so arranged that when in its deënergized position it will supply current to the clutch coil 37, so as to insure that the motor-operated rheostat 35 is rotated to its full resistance position before coming to rest after the close of braking operations. Current for the operation of the motor during this action will be supplied through the limit switch 41, and when the full resistance position has been reached, the limit switches 41 and 42 will be opened, thereby deënergizing the clutch coil 37 and cutting off the supply of power for the motor. This insures that the rheostat will be found in the full resistance position when braking is again commenced, instead of being left in any position where it chanced to be at the time the braking controller was thrown off.

The motor generator set 20 will be in operation practically all the time, and inasmuch as all the current supplied to the traction motors flows through the differential series field winding 28 of the exciter 25 when the motors are arranged in series relation and all the current supplied to one of the traction motors flows through the differential series field winding 28 when the motors are arranged in parallel, then it follows that the exciter 25 is provided with an excitation which varies with the traction motor current, and that the voltage of the exciter armatures will vary with the drop across the field windings 11 and 13, so that when the contactors 48 and 49 are closed no marked change in operation will be had. As previously described, the connections of the windings of the contact-making ammeter are such that upon movement of the controller 45 to the step a, just such an amount of current will be supplied to the fields 11 and 13 that a minimum amount of braking will be had. In common with systems of this type, the action of the exciter will be such that the machines 10 and 12, acting as generators, will be stabilized, since the direction and amount of the excitation supplied to them is absolutely controlled. The circuit, traversed by the regenerated current during the braking operation with the motors arranged in series, comprises ground, exciter differential field winding 28, contacts 66 on the braking lighting controller 60, winding 52 on the contact making ammeter 50, commutator 27 of the exciter 25 and the armature winding connected thereto, switch 49, main controller 15, contacts 62 of the braking lighting controller 60, commutator 26 of the exciter 25 and the armature winding connected thereto, switch 48, main controller 15, armature 12, main controller 15, armature 10, main controller 15, trolley T, and generating station (not shown). The circuits, traversed by the current generated in armature 12 during the braking operation with the motors arranged in parallel, comprises ground, exciter differential field winding 28, contacts 66 on the braking lighting controller 60, winding 52 on the contact making ammeter 50, commutator 27, switch 49, main controller 15, armature 12, main controller 15, trolley T, and generating station (not shown) and the circuit, traversed by the current generated in armature 10, comprises ground, main controller 15, contacts 62 on the braking lighting controller 60, commutator 26, switch 48, main controller 15, armature 10, main controller 15, trolley T, and generating station (not shown). The path or paths taken by the regenerated current when the motors are connected in series or parallel are indicated in Figs. 5 and 6 by full line arrows. In addition, a current is supplied by the exciter, which is superimposed on the motor armature current and passes through the motor fields in the same direction as in motoring operations. The paths taken by the exciting currents supplied by the exciter 25 are indicated in Figs. 5 and 6 by broken line arrows. The sum of the currents in the motor armature and field winding is, therefore, passing through the exciter armatures, and if this current, with the connections shown, is held constant, then the above-mentioned sum will be held constant, and this is effected by the action of the contact-making ammeter upon the exciter field rheostat. This action is comparatively slow, and cannot follow short, sudden variations of current. Variations in motor currents in their passage through the differential field 28 will, however, so act that the exciter 25 will quickly tend to counteract these changes, as the response of this field to sudden variations of current is almost instantaneous. The result of the combined actions of the field 28 and the automatic control will be, that the speed torque characteristic of the motors 10 will be practically that of a series motor, except that it will be displaced with reference to the torque axis, so that if sufficient speed is reached a braking torque will be obtained. The amount of this shifting of the speed torque curve will be determined by the amount of separate excitation supplied from the exciter 25, but the shape of the characteristic curve will be retained, and a stable braking secured over the usual working range. Such a result is highly desirable in order that an increase of speed, due to a sudden change in grade, or any other cause, may automatically cause an increase in the braking torque.

In Fig. 2, I have diagrammatically illustrated the application of my control system to multiple unit operation. Portions of the apparatus for two cars are shown, and in the first car a single motor, having an armature $10^a$ and a field winding $11^a$, is shown connected between the trolley and ground. An exciter $25^a$, which is supplied with a differential series field $28^a$ and a main field (not shown in this figure), is connected across the field $11^a$. The characters 50, 53, 54 and 55 refer to the same parts as have been previously described in connection with Fig. 1. In this car, a portion of a controller $45^a$ is arranged to energize successively various taps of a resistance $56^a$, adapted to be connected to one terminal of the coil 53, and to connect the other terminal of this coil to ground. The taps of the resistance $56^a$ and the terminals of the relays 54 and 55 are connected with the train wires $W_1$ which extend the length of the car X, and are adapted to be connected to similar train wires $W_2$ on the second car Y. The wires $W_2$ are connected to the windings 54 and 55 and the taps of resistance $56^b$ on this second car, while in conjunction with said taps I have shown a portion of a controller $45^b$, similar to the controller $45^a$. In practice, each of these controllers is constructed like the controller 45 in Fig. 1. The numerals $10^b$, $11^b$, $25^b$, and $28^b$ refer to similar parts as the numerals $10^a$, $11^a$, $25^a$, and $28^a$ on car X.

The braking of such a train may be controlled by the manipulation of either controller $45^a$ or $45^b$, with the result that the setting of the contact-making ammeter in each car is identical, and, consequently, that the exciter armature current is held constant at the same value in each car. Since train wires have been provided connecting all the taps of the resistances $56^a$ and $56^b$, the current flow through each resistance is the same as for a single unit, and, therefore, the setting of the controller in any particular position will hold the current flow in each exciter armature constant at the same value, regardless of the number of units.

It will also be seen that I have provided a simple and economical way of changing the setting of the contact-making ammeter, in order that the amount of braking at any particular speed may be absolutely determined. By using a separate winding on a contact-making ammeter, and controlling the direction and magnitude of the current supplied to this winding, I am enabled to get twice as many control steps as I have subdivisions of the resistance 56. If, then, it is desired to use my arrangement for multiple unit operation, it will be seen that I have greatly reduced the number of train wires needed for this particular device. As shown, these train wires are connected to the taps of the resistances $56^a$ and $56^b$ and to the terminals of the windings 54 and 55. I may then, by the addition of a single train wire and resistance section, provide two more steps on the braking controller.

Furthermore, it will be seen that by my design of control apparatus, the operation of the equipments of the various units operating in multiple may be kept practically alike; that is to say, since each car or locomotive is automatically maintaining constant exciter current at a certain value by means of the contact-making ammeter, I have only to similarly vary the settings of the various ammeters in order to be assured that the operation of the several units is substantially identical. As has been previously stated, the use of a differential excitation for the exciter 25 tends to counteract sudden changes in the sum of the currents in the motor armature and maintain the field constant. Multiple unit control of such a system, however, without the use of automatic devices, cannot assure similar operation of the units and equal division of braking load, because of variations in speed of the control sets, difference in wheel diameter, in motor armature resistance, and in the flux condition of the motors. Obviously, exactly equal division of the load could be secured by automatically holding the motor armature current constant in the manner illustrated in the application of J. J. Linebaugh, Serial No. 854,074, filed July 30, 1914, patented Dec. 18, 1917, No. 1,250,906, assigned to the same assignee as this application. It has been found, however, that under some conditions the maintenance of constant line current does not give a sufficiently stable operating characteristic, so that increase of speed will be accompanied by an increase in torque. By means of my arrangement of automatic control, multiple unit operation with a stable speed torque characteristic and substantially equal division of the load is possible.

Any normal variations in trolley potential will be automatically taken care of by the action of the differential field. It may happen, however, that the trolley becomes accidentally disengaged from the trolley wire, or that, for some other reason, the connection between the locomotive and the load on the trolley line becomes broken. Since this will prevent the flow of any current through the differential field winding 28, it will be seen that an excitation which has been opposing that furnished by the main field winding 29 is suddenly removed, and that, consequently, the main field winding may furnish so strong an excitation that the voltage generated by the traction motors will be greatly in excess of what they can safely carry. As soon as this happens, however, the trip coil 106 of the high voltage relay 105 will be energized sufficiently to open the contacts 108. When this happens the ability of the moving arm of the rheostat 35 to short circuit portions of its resistance will be taken away, so that the whole of this resistance will be inserted in the circuit of the main field winding 29, and that, consequently, the exciter potential, and, therefore, the traction motor potential, will be greatly reduced. The opening of this relay will also open the contacts 108ª in circuit with the transfer relay 57, with the result that the motor-operated rheostat will be returned to its full resistance position. If, then, it is desired to recommence the braking operation, it will be necessary to return the braking controller 45 to its open position, and to then return the main controller 15 to its first position, so as to again energize the reset coil 107 of the high voltage relay 105. The braking operations can be then continued by proper manipulation of the controllers 15 and 45 in the manner previously described.

For convenience, I have diagrammatically shown in Fig. 7, the principal circuits which will be obtained when the locomotive is being used for regenerative braking. The numeral 35ª designates the motor-operated rheostat as controlled by its contact-making ammeter in the way previously described. If the locomotive is not being used for regenerative braking, then the motor generator set thereon may be utilized for charging the storage battery or for lighting the train, and if so used the main connections will be those shown in Fig. 8, wherein 35ᵇ designates the motor-operated rheostat under the control of the contact-making voltmeter, and the other numerals designate the same parts as in Fig. 1. It will then be seen that the two armature windings of the exciter 25 are connected in series and are adapted to supply current directly to the batteries 77 and indirectly to the lights 76 through the resistance 86.

If the operator desires to supply current for lighting the train, he will first close the switches 84 and 85, thereby allowing current to flow from the storage battery 77 to the lights 76 through the rheostat 86. The potential applied to the lights may then be adjusted by adjusting this rheostat. For convenience of description, I will hereinafter refer to the train line 75 as the generator line $r$, the battery line $s$, and the lamp line $t$. It may be desired to utilize the motor generator set for supplying current to the line in parallel with the storage battery, or even for charging the storage battery, and if this is the case the operator will, after having taken the precaution to move the arm of the rheostat 91 to the right, so as to cut out all the resistance, throw the control switch 72 to the contact 73 and hold it there long enough to allow the braking-lighting switch 60 to be thrown to the lighting position. It will be seen that the throwing of this control switch 72 to the contact 73 will energize the coil 68 to thereby cause the throwing over of the switch 60 to the position L. If for any reason it is attempted to carry out this operation while the motor generator set is still being used for braking, then it will be seen that, owing to the energization of the relay 97, it will be impossible to energize the coil 68. When the switch has been thrown it will close the contacts 61, 63, 64, and 65. The last of these will short circuit the series field winding 28, while the other three will connect the exciter armatures in series with one another to the generator train line $r$ and the circuit breaker 78. The control switch 72 should then be thrown to its contact 74 and left there as long as the lighting operation is continued. When this is done, the lighting relays 92 and 93 will be energized. The relay 92 is a transfer relay corresponding in function to the transfer relay 57, and when in its energized position connects the moving arm of the contact-making voltmeter 90 to one side of the control generator, and when in its deënergized position insures that the motor-operated rheostat 35 shall be returned to its full resistance position. The relay 93 when energized places the coil of the voltmeter 90 across the terminals of the series connected exciter armatures. Its setting can be adjusted by adjustment of the rheostat 91 to cause the voltmeter to operate the rheostat 35 so as to hold constant voltage on said exciters at any desired value.

The circuit breaker 78 should now be closed, and the rheostat 91 adjusted so that the voltage is raised until it is equal to the lamp voltage. If it is desired to still further increase the voltage of the exciter so as to supply current for charging the storage battery, then the rheostats 91 and 86 must both be adjusted in order that the voltage supplied to the lamps may not be excessive. If for any reason the generator load becomes excessive, the current flowing through the series coil 80 of the circuit breaker 78 will be sufficient to attract the trip 81 and thereby open said circuit breaker. On the other hand, if for any reason the power supplied to the motor generator set should fail, the batteries will try to supply current to operate the exciter 25 as a motor. When this reaches a predetermined amount, normally much less than the amount of over-load current required to trip the circuit breaker, the latter will again trip out. If for any reason it is desired to cease lighting operations, then the opening of the control switch 72 will deënergize the relays 92 and 93. The latter of these is arranged in its deënergized position to short-circuit a resistance 83 in series with the shunt coil 79 of the circuit breaker, and when this resistance is short-circuited the current passing therethrough will be sufficient to trip the same and open the breaker. By the provision of an auxiliary contact 82, it will be seen that the circuit of the shunt coil 79 is opened whenever the circuit breaker is not in use, and that thereby heating of the same is prevented.

If the engineer should find it necessary to use regenerative braking at any time when the motor generator set was being utilized for lighting, it would only be necessary for him to move his braking controller 45 into its first position $a$, in which position the relay 97 will be energized, thereby opening the circuit of the coil 68 and allowing the coil 69, whose circuit is simultaneously closed, to throw the switch 60 to its braking position B. Owing to the fact that the circuit of the lighting relays 92 and 93 passes through the interlock 71 from said switch, then it will be seen that these relays will be simultaneously deënergized as soon as the switch is moved to the braking position, and that thereby control of the motor-operated rheostat 35 is taken away from the voltmeter 90. The dropping out of the relay 93 will, in the manner just described, cause the circuit breaker 78 to trip and thus necessitate the attention of the operator in case it is desired to again use the motor generator set for lighting. The rheostat 86 should preferably be adjusted at this time so that the voltage delivered to the lamps by the battery 77 will be correct. At the same time, the control switch 72 should preferably be opened and the rheostat 91 turned to its no-resistance position.

If two locomotives are being operated in multiple, it may sometimes happen that it is desired to utilize one of these for lighting, while the other is being used for braking. Such an operation is made possible by the provision of the braking cut-out switch 95 and the associated relay 96. When this cut-out switch 95 is opened, then the connection of the braking controller to the braking lighting switch 60, relay 97 and the switches 48 and 49 is broken, and the motor generator set can be utilized for lighting.

It will, therefore, be readily seen by an inspection of Figs. 7 and 8, that I have provided a very economical arrangement whereby the same motor generator set and motor-operated rheostat may be utilized both during braking and train lighting, being in the one instance controlled by means of a contact-making ammeter, and in the other instance by means of a contact-making voltmeter.

Although I have herein shown one specific embodiment of my invention, I conceive that various modifications of the details thereof might be made, and I accordingly do not wish to be limited to this exact arrangement, but seek to cover in the appended claims all those modifications which come within the true scope and spirit of my invention.

I have not claimed broadly herein means for varying the potential of said exciter to hold the sum of the motor armature and field currents constant, since this is claimed in an application of Ernst F. W. Alexanderson, Serial No. 83,659, filed March 11, 1916, and assigned to the same assignee.

What I claim as new and desire to secure by Letters Patent of the United States, is:—

1. In combination, a dynamo-electric machine having a field winding in series with its armature, a separately controllable source of potential connected to said series field winding, means for controlling the potential supplied by said source, and means responsive to the sum of the currents in the armature and field windings of said machine for regulating said controlling means.

2. In combination, a dynamo-electric machine having a field winding in series with its armature, a separately controllable source of potential connected to said series field, a resistance for controlling the potential supplied by said source, and means responsive to the sum of the currents in the armature and field of said machine for controlling the effect of said resistance.

3. In combination, a dynamo-electric machine having a field winding in series with its armature, a separately controllable source of potential connected to said series field, a resistance for controlling the potential supplied by said source, and means responsive to variations of current in said source for controlling the effect of said resistance.

4. In combination, a dynamo-electric machine having a field winding connected in series with its armature, a separately controllable source of potential connected to said series field, a resistance for controlling the potential supplied by said source, and current responsive means controlling the effect of said resistance arranged to hold the sum of the currents in the armature and field of said machine constant.

5. In combination, a dynamo-electric machine having a field winding connected in series with its armature, a separately controllable source of potential connected across said series field, a power operated rheostat for controlling the potential supplied by said source, and a contact-making ammeter responsive to the current in said source for controlling the extent and direction of movement of said rheostat.

6. In combination, a dynamo-electric machine having a field winding connected in series with its armature, an auxiliary dynamo-electric machine connected across said series field winding, means for driving the latter machine as a generator, means for varying its excitation, and automatic means external to said auxiliary machine for controlling said last mentioned means arranged to hold constant the current flowing in the armature circuit of said auxiliary dynamo-electric machine.

7. In combination, a dynamo-electric machine having a field winding connected in series with its armature, an exciter having a field winding and adapted to be connected to the series field winding of said dynamo-electric machine, and means, for varying the current in said exciter field winding, comprising a contact making ammeter having a winding serially arranged with respect to the exciter armature and a winding adapted to be energized from an adjustable source of current.

8. In combination, a dynamo-electric machine having a field winding connected in series with its armature, an exciter provided with a main field winding and a differential series field winding and adapted to be connected across the series field winding of said dynamo-electric machine, means for varying the current in the main field winding of said exciter comprising a power operated rheostat, a contact making ammeter provided with a winding serially arranged with respect to the armature of said exciter for controlling the extent and direction of movement of said rheostat, a second winding on said ammeter, means for controlling the value and direction of current in the latter winding, and means responsive to the voltage across said first named machine for decreasing the current in the main field winding of said exciter.

9. A regenerative braking system comprising a supply circuit, a dynamo-electric machine connected to said circuit and having a field winding in series with its armature, an exciter connected in a local circuit with said field winding and arranged to supply current thereto to cause said machine to return energy to said circuit, means responsive to a decrease of current in the armature of said machine during the generating operation thereof for increasing the excitation of said exciter to increase the current in said field winding, and means operated when said machine is disconnected from said supply circuit while returning energy thereto for decreasing the excitation of said exciter.

10. A regenerative braking system comprising a supply circuit, a dynamo-electric machine connected to said circuit and having a field winding in series with its armature, an exciter connected in a local circuit with said field winding and arranged to supply current thereto to cause said machine to return energy to said circuit, said exciter having a main field winding and a differential field winding in series with the armature of said machine, means responsive to a decrease of current in the armature of said machine for increasing the current in said main field winding to increase the current in the field winding of said machine, and means operated when said machine is disconnected from said supply circuit while returning energy thereto for decreasing the current in said main field winding.

11. A regenerative braking system comprising a supply circuit, a dynamo-electric machine connected to said circuit and having a field winding in series with its armature, an exciter connected in a local circuit with said field winding and arranged to supply current thereto to cause said machine to return energy to said circuit, a resistance for controlling the excitation of said exciter, means responsive to a decrease in current in the armature of said machine for short circuiting more or less of said resistance to increase the current in the field winding of said machine, and means operated when said machine is disconnected from said supply circuit while returning energy thereto for rendering said short circuiting means ineffective.

12. In combination, a plurality of traction units each of which comprises a dynamo-electric machine having a field winding and adapted to operate alternatively as a motor or as a generator, an exciter adapted to be connected in a local circuit with said field winding, automatic means responsive to the sum of the currents in the armature and said field winding of said dynamo-electric machine for controlling the excitation of said exciter and means operable from any unit for controlling the operation of said automatic means.

13. In combination, a plurality of traction units each of which comprises a motor having a series field winding, an exciter connected in a local circuit with said field winding, a resistance arranged to control the excitation of said exciter, current responsive means for controlling said resistance to hold the sum of the currents in the armature and field of said motor at constant values, and means operable from any unit for determining the value at which said current responsive means will hold the sum of the currents in the armature and field of said motor.

14. A regenerative braking system comprising a dynamo-electric machine having a field winding connected in series with its armature, an auxiliary dynamo-electric machine connected in a local circuit with said field winding, quick acting means for holding constant the sum of the currents in the armature and field of said first named dynamo-electric machine comprising a differentially connected series field winding for said auxiliary machine, and slow acting means for the same purpose comprising a current responsive relay arranged to control the excitation of said auxiliary machine.

15. A regenerative braking system comprising a dynamo-electric machine having a field winding connected in series with its armature, an auxiliary dynamo-electric machine connected across said field winding, said auxiliary machine being provided with a main field winding and a series field winding, and automatic means responsive to the current in the armature of said auxiliary machine controlling said main field winding.

16. In combination, a traction motor having its field windings connected in series with its armature, a dynamo-electric machine, a resistance for controlling the excitation of said machine, a load circuit, means for connecting said machine to the field winding of said traction motor or to said load circuit, means responsive to variations of current in the armature of said traction motor controlling said resistance when said machine is connected to said field winding, and means responsive to an electrical condition of said load circuit for controlling said resistance when said machine is connected to said load circuit.

17. In combination, a traction motor having its field winding connected in series with its armature, a dynamo-electric machine, a resistance for controlling the excitation of said machine, a load circuit, means for connecting said machine to the field winding of said traction motor or to said load circuit, means responsive to the sum of the currents in the armature and field windings of said traction motor controlling said resistance when said machine is connected to said field winding, and means responsive to an electrical condition of said load circuit for controlling said resistance when said machine is connected to said load circuit.

18. In combination, a traction motor having its field winding connected in series with its armature, a dynamo-electric machine, an automatic rheostat for controlling the excitation of said machine, a load circuit, means for connecting said machine to the field winding of said traction motor or to said load circuit, a contact-making ammeter responsive to the sum of the currents in the armature and field windings of said traction motor controlling said automatic rheostat when said machine is connected to said field winding, and a contact making voltmeter responsive to the voltage of said load circuit for controlling said automatic rheostat when said machine is connected to said load circuit.

19. In combination, a plurality of traction motors, each of which has its field winding connected in series with its armature, an exciter provided with two armature windings connected to independent commutators, a resistance for controlling the excitation of said machine, a load circuit, means for connecting one of the commutators of said exciter to the field windings of certain of the traction motors and for connecting the other commutator of the exciter to the field windings of others of the traction motors, and for connecting the commutators of said exciter in series with one another to said load circuit, means responsive to variations of the current flowing through one of the armature windings of said exciter for controlling said resistance when said exciter is connected to said field windings, and means responsive to the voltage of said load circuit for controlling said resistance when said exciter is connected to said load circuit.

In witness whereof, I have hereunto set my hand this 15th day of March, 1916.

WILLIAM S. H. HAMILTON.